United States Patent [19]
Jones et al.

[11] Patent Number: 5,135,824
[45] Date of Patent: Aug. 4, 1992

[54] COAXIAL TERMINAL CONSTRUCTION FOR A SEALED PRESSURIZED BATTERY

[75] Inventors: Kenneth R. Jones, Oconomowoc; James M. Wilson, Milwaukee, both of Wis.

[73] Assignee: Globe-Union Inc., Milwaukee, Wis.

[21] Appl. No.: 590,005

[22] Filed: Sep. 28, 1990

[51] Int. Cl.$^5$ .............................................. H01N 2/30
[52] U.S. Cl. ................................... 429/178; 429/181; 429/101
[58] Field of Search ............................... 429/178–183, 429/101, 181, 27, 185

[56] References Cited

U.S. PATENT DOCUMENTS

| | | | |
|---|---|---|---|
| 2,914,595 | 11/1959 | Darland, Jr. et al. | 429/27 |
| 3,867,199 | 2/1975 | Dunlop et al. | 429/101 |
| 3,959,018 | 5/1976 | Dunlo et al. | 429/40 |
| 4,324,845 | 4/1982 | Stockel | 429/101 |

*Primary Examiner*—Anthony Skapars
*Attorney, Agent, or Firm*—Andrus, Sceales, Starke & Sawall

[57] ABSTRACT

A coaxial terminal construction for a sealed pressurized battery. The battery includes a sealed vessel containing a series of battery cells and positive and negative poles are connected to the cells. A pre-assembled terminal unit extends through an annular mounting flange that is secured within an opening in the vessel wall and the pre-assembled unit includes an inner electode, an outer electrode, which is disposed concentrically outward of the inner electrode and insulated therefrom, and an annular mounting member which is located concentrically outward of the outer electrode and insulated therefrom. All three concentric members have external threads of the same pitch. The terminal unit is installed by threading the mounting member in the mounting flange of the vessel and simultaneously threading the outer electrode with a nut connected to one of the poles and threading the inner electrode with a second nut connected to the other of the poles. The mounting member can be crimped inwardly to provide a seal between the three concentric members.

23 Claims, 1 Drawing Sheet

0
COAXIAL TERMINAL CONSTRUCTION FOR A SEALED PRESSURIZED BATTERY

BACKGROUND OF THE INVENTION

Metal oxide-hydrogen batteries, such as nickel oxide-hydrogen batteries, have seen use as aircraft starter batteries and in aerospace applications, because they are rechargeable, have an extremely long cycle life and provide a uniform output during the entire discharge cycle.

In the typical nickel oxide-hydrogen battery, the battery cells are sealed in an outer pressure vessel that contains pressurized hydrogen gas. On discharge of the battery, the hydrogen gas diffuses through the electrolyte surrounding the catalyst surfaces of the negative plates and becomes disassociated to the mono-atomic form. The mono-atomic hydrogen is ionized and combines with hydroxyl ions to form water with an electron being released in the process of forming each hydrogen ion. In addition, hydroxyl ions are formed at the positive electrode by the reaction of water with the available oxygen content of the nickel oxide. As a result of these reactions an electron current is produced in the exterior circuit.

On recharging, the reaction is reversed, with the recharging being characterized by the regeneration of hydrogen at the negative electrode and the reoxidation of the nickel hydroxide at the positive electrode.

In practice, the exterior electrical connection is made to the battery cells after the outer pressure vessel is formed around the cells. A common technique has been to form single polarity termination stems at each end of the vessel which are sealed within openings in the opposite heads of the vessel.

In certain instances in order to accommodate the user's requirements, a coaxial termination assembly would be desirable in which both the negative and positive poles exit at the same end of the vessel. For example, in an aircraft starting battery, the battery normally contains an external plug-in connection and to accommodate the plug-in connection it would be advantageous to have a coaxial battery termination in which both poles extend in coaxial relation through a single end of the pressure vessel. If the poles exit from opposite ends of the vessel, at least one of the external conductors leading to the plug-in connection would have to have a substantially increased length which could detract from the performance of the battery, as well as increasing the overall battery length which is a critical factor in certain applications having limited space, such as aircraft starting applications.

SUMMARY OF THE INVENTION

The invention is directed to a coaxial terminal construction for a sealed pressurized battery, such as a metal oxide hydrogen battery. The battery includes an outer sealed pressure vessel which houses a series of battery cells and positive and negative poles or terminals are connected to the cells and are located within the vessel.

In accordance with the invention a pre-assembled terminal unit extends through an annular mounting flange that is secured within an opening in the vessel wall and the terminal unit includes an inner electrode, an outer coaxial electrode and an annular mounting member or sleeve which is located coaxially and outward of the electrodes. The three coaxial members are separated by insulating sleeves preferably formed of a thermoplastic resin, and all three members are provided with external threads of the same pitch.

The terminal unit is inserted through the opening in the mounting flange and the mounting sleeve is threaded in the flange and simultaneously the outer electrode is threaded in a nut connected to one of the battery poles, while the inner electrode is threaded to a second nut connected to the other of the battery poles.

With this construction all three threaded connections are made simultaneously due to the common pitch on the threads, even though the three threaded members have different diameters.

The terminal unit not only provides a positive electrical connection to the battery cells, but also provides a hermetic seal which will withstand the elevated pressure of the hydrogen gas contained within the vessel. The seal is provided by a compressible O-ring which is located between the mounting sleeve and the mounting flange and the O-ring is compressed as the mounting member is threaded down into the flange. In addition a portion of the length of the mounting sleeve is crimped or deformed radially inward to provide a positive seal between the three concentric components.

As both the positive and negative conductors exit in coaxial relation from the same end of the vessel, the overall length of the vessel is reduced as compared to batteries in which the negative and positive poles exit from opposite ends. The coaxial termination makes the battery particularly adapted for use in applications having limited space requirements.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
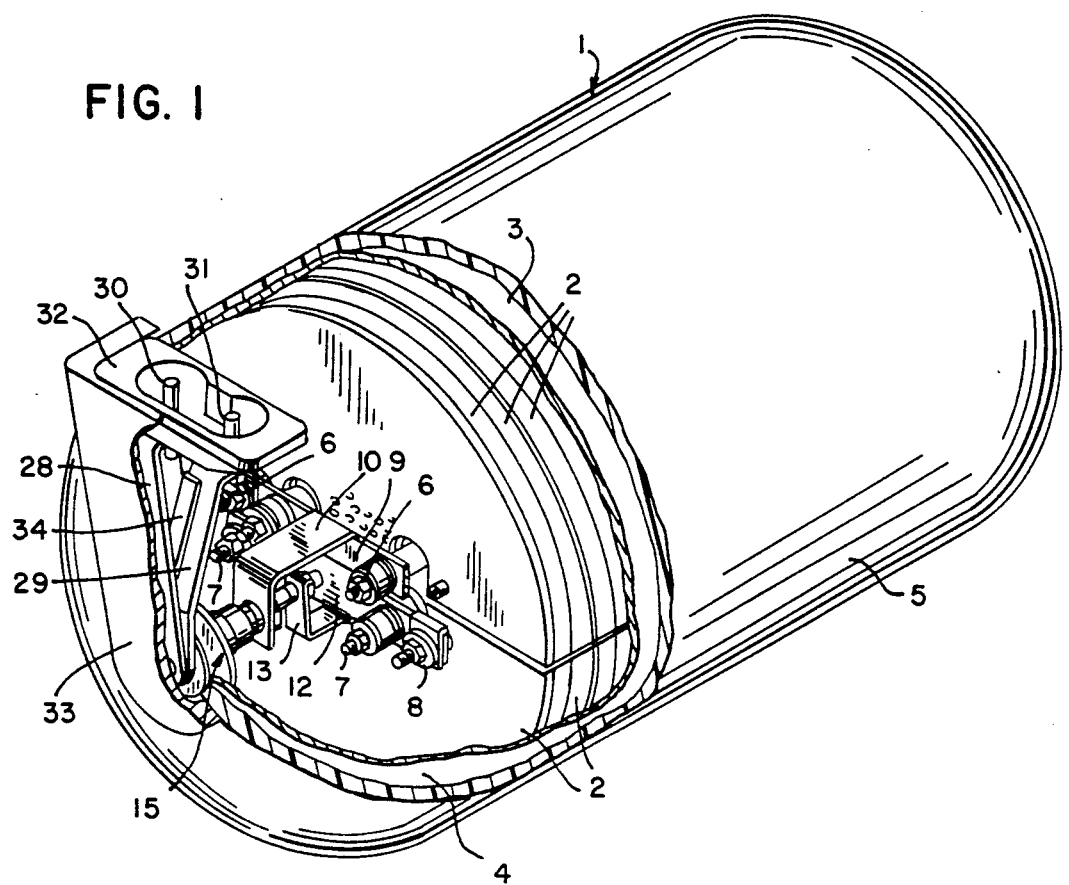
FIG. 1 is a perspective view with parts broken away showing a metal oxide-hydrogen battery incorporating the coaxial termination construction of the invention.

FIG. 1 illustrates a rechargeable metal oxide hydrogen battery, such as a nickel oxide-hydrogen battery. The battery is composed of an outer pressure vessel 1 that houses a group of battery cell modules that can be constructed as disclosed in the U.S. patent application Ser. No. 07/334,341, filed Apr. 7, 1989, and entitled Metal Oxide-Hydrogen Battery. As disclosed in the aforementioned patent application, the vessel 1 contains two semi-cylindrical stacks of the cell modules 2, with the modules in each stack being in side-by-side relation. In general, each module is composed of a pair of back-to-back positive electrodes spaced apart by a separator layer, along with a pair of negative electrodes, each disposed adjacent and separated from a positive electrode. The positive electrodes are in the form of flat, porous, sintered metal plaques impregnated with nickel hydroxide, while the negative electrodes are in the form of fine mesh nickel screens having a catalyst, such as platinum black, bonded to one surface of the screen through a hydrophobic polymeric material. An electrolyte, such as potassium hydroxide solution, is impregnated into the fibrous separator layers that separate the electrodes. The modules can be connected together either in series or parallel relation to obtain the desired voltage output.

Vessel 1 is formed of metal, such as stainless steel, and includes a central cylindrical shell 3, the ends of which are enclosed by dome-shaped heads 4. A filament wound layer 5 of fiber reinforced resin can be wound around the metal vessel 1 by a conventional filament winding process.

As shown in FIG. 1, the negative plates of the cells are connected together through a pair of conductor or tie rods 6, while the positive plates are connected by tie rods 7.

The cell modules 2 are secured together in side-by-side relation by a plurality of mounting bolt assemblies indicated generally by 8.

A conductor plate 9 is electrically connected to the negative tie rods 6 and a generally L-shaped bracket 10 extends forwardly from plate 9 and carries an internally threaded nut 11. Similarly, a conductor plate 12 is electrically connected to the positive tie rods 7 and an L-shaped bracket 13 extends forwardly from the lower edge of plate 12 and carries an internally threaded nut 14. Nuts 11 and 14 are disposed in axial alignment.

Figure 2:
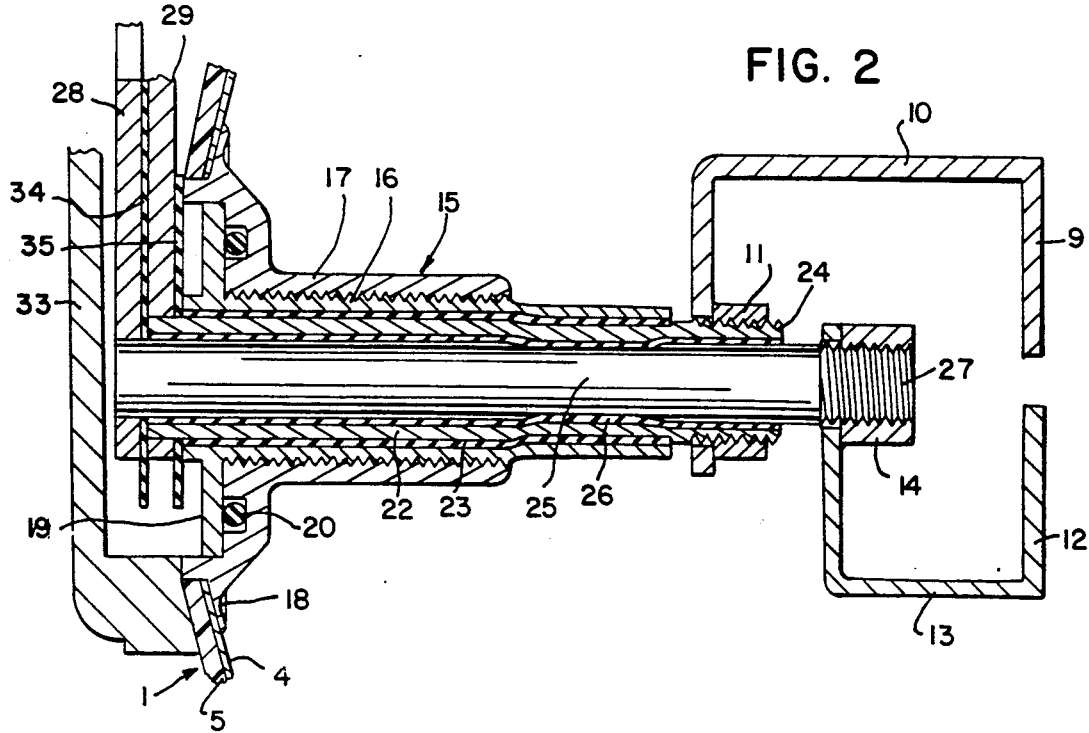
FIG. 2 is a longitudinal section of the termination unit.

In accordance with the invention, a pre-assembled terminal unit or assembly 15 provides a simultaneous electrical connection between external electrodes and nuts 11 and 14. The pre-assembled unit 15 includes an annular mounting member or sleeve 16 having an external thread which is engaged with the internal thread of a mounting flange 17, that is secured within an opening in one of the heads of vessel 1. Sleeve 16 is preferably composed of a high strength metal, such as stainless steel or Inconel. As shown in FIG. 2, mounting flange 17 is provided with a peripheral lip 18 and the edge of the metal head 3 bordering the opening therein is welded to the lip. In addition, the filament wound layer 5 extends over the edge of the head 3, as well as lip 18, as seen in FIG. 2.

Mounting sleeve 16 is provided with a radially extending flange 19 and flange 19 is adapted to be sealed against the outer surface of mounting flange 17 by an O-ring seal 20, which is located in a groove 21 formed in the outer surface of mounting flange 17. As mounting sleeve 16 is threaded down into mounting flange 17, O-ring 20 will be compressed to provide a seal between the members.

The pre-assembled terminal unit 15 also includes an outer tubular electrode 22, which is located inwardly of mounting sleeve 16 and is insulated from the mounting sleeve by an insulating sleeve 23, preferably formed of a thermoplastic resin, such as nylon or the like. The inner end of electrode 22 projects beyond the inner end of mounting sleeve 16 and is provided with an external thread 24 which is engaged with nut 11, as shown in FIG. 2.

The pre-assembled terminal unit 15 also includes an inner electrode 25 which is located concentrically within outer electrode 22 and is separated therefrom by an insulating sleeve 26 formed of a thermoplastic resin, such as nylon or the like. As shown in FIG. 2, the inner end of electrode 25 projects beyond the inner end of electrode 22 and is threaded, as indicated by 27. The thread 27 is engaged with nut 14 to provide a positive electrical connection between the nut and the electrode.

The threads on the mounting sleeve 16 and on electrodes 22 and 25 are spaced axially of each other and all have the same pitch. Normally, members of different diameters will have different thread pitches, but as the pitches on all three threads are the same, the threaded connections of all three concentric members can be made simultaneously.

Electrodes 22 and 25 are preferably formed of a material having a high coefficient of electrical conductivity, such as copper, and it is preferred that the cross sectional area of inner electrode 25 be substantially the same as the cross sectional area of the outer tubular electrode 22.

The outer projecting end of inner electrode 25 is connected electrically to a bus bar 28 and similarly the outer end of electrode 22 is connected to bus bar 29. Bus bars 28 and 29 are connected to terminals 30 and 31 respectively of a plug-in connector 32, which is supported by a bracket 33.

Bus bars 28 and 29 are separated from each other by a sheet of insulating material 34, while bus bar 29 is separated from the outer surface of mounting flange 17 by a second sheet or layer of insulating material 35. Insulating layers 34 and 35 can be composed of a thermoplastic resin, such as nylon or polyethylene.

To provide a hermetic seal between the three concentric members 16, 22 and 25 and prevent leakage of the contained gas along the interfaces between the members, a portion of the inner end of mounting sleeve 16 is crimped radially inward, as indicated by 36. The crimping will tend to slightly deform the electrodes, compressing the insulating sleeves 23 and 26, and providing a positive seal between the members.

As seen in FIG. 2, the crimped area 36 is spaced from the threaded portion of the mounting sleeve 16, as well as being spaced from the threaded ends of electrodes 22 and 25, so that the crimping will not effect the threads.

To assemble the terminal unit 15, the two electrodes 22 and 25, as well as the insulating sleeves 23 and 26, are assembled within the mounting sleeve 16 and the inner end of the mounting member is then crimped inwardly as at 36 to provide the seal between the three concentric members. The pre-assembled unit is then inserted into the opening in mounting flange 17 and the threads are arranged so that mounting member 16 will start to thread with the flange 17 at substantially the same time as the electrodes 22 and 25 will thread with the nuts 11 and 14 respectively. When the terminal unit is fully threaded down, the O-ring seal 20 will be compressed to provide a seal between the sleeve 16 and mounting flange 17.

While the above description has shown the terminal unit as associated with a metal oxide hydrogen battery, it is contemplated that the terminal unit can be incorporated with any type of sealed battery which is contained within an outer pressure vessel.

The invention enables all three threaded connections to be made simultaneously due to the common thread pitch. Not only is a positive threaded connection provided between electrodes 22 and 25, and the corresponding nuts 11 and 14, but the terminal unit provides a sealed connection which is capable of withstanding the high pressure of the contained gas within the vessel.

As the electrical connections are made through only a single opening in the vessel wall, as opposed to multiple openings, the construction is simplified and the potential for leakage is reduced.

As both electrodes exit through the same end of the vessel, the overall length of the vessel is reduced as compared to a battery in which the positive and negative poles exit through opposite ends of the vessel. This makes the battery particularly adaptable for use in applications having limited space requirements.

Various modes of carrying out the invention are contemplated as being within the scope of the following claims particularly pointing out and distinctly claiming the subject matter which is regarded as the invention.

We claim:

1. A coaxial terminal construction for a sealed battery, comprising a sealed vessel having an opening therein; an annular mounting flange secured within the opening and having an internal thread; a group of battery cells disposed within the vessel and having a pair of electric terminal means; a pre-assembled terminal unit including a first electrode, a second electrode insulated from said first electrode and disposed concentrically around said first electrode, an annular mounting member disposed concentrically around said second electrode and insulated therefrom, said mounting member having an external thread engaged with the internal thread of said mounting flange; first connecting means for effecting an electrical connection between a first of said terminal means and said first electrode as said mounting member is threaded in said mounting flange; and second connecting means for effecting an electrical connection between a second of said terminal means and said second electrode, as said mounting means is threaded to said mounting flange.

2. The construction of claim 1, and including sealing means disposed between said mounting flange and said mounting member.

3. The construction of claim 1, and including sealing means disposed between said first and second electrodes and disposed between said second electrode and said mounting member.

4. The construction of claim 3, wherein a portion of said mounting member is deformed radially inward to provide said sealing means.

5. The construction of claim 1, wherein said first connecting means comprises an internally threaded element connected to said first terminal means, and an external thread on said first electrode engaged with said internally threaded element.

6. The construction of claim 1, wherein said second connecting means comprises an internally threaded element connected to said second terminal means, and an external thread on said second electrode engaged with said internally threaded element.

7. The construction of claim 5, wherein the pitch of the thread on the mounting member is the same as the pitch of the external thread on the first electrode.

8. The construction of claim 6, wherein the pitch on the mounting member is the same as the pitch of the external thread on the second electrode.

9. A coaxial terminal construction for a sealed battery, comprising a sealed pressure vessel having an opening therein; an annular mounting flange secured in alignment with the opening and having an internal thread; a plurality of battery cells disposed within the vessel and having a pair of electrical terminal means; a pre-assembled terminal unit extending through said annular mounting flange and including a first electrode member, a second electrode member disposed concentrically around the first electrode member and insulated therefrom, and an annular mounting member disposed concentrically around said second electrode member and insulated therefrom, said first electrode member having an external thread, a first of said terminal means having an internally threaded element engaged with the thread on said first electrode member, said second electrode member having an external thread, a second internally threaded element connected to a second of said terminal means and engaged with the thread on said second electrode member, said mounting member having an external thread engaged with the internal thread of said mounting flange, the thread on said first electrode member and the thread on said second electrode member and the thread on said mounting member all having the same pitch.

10. The construction of claim 9, wherein the threaded elements are nuts.

11. The construction of claim 10, wherein each terminal means includes a bracket to carry the respective nut.

12. The construction of claim 10, wherein the nuts are axially aligned and spaced axially from each other.

13. The construction of claim 9, and including a bus bar connected to the outer end of each electrode.

14. The construction of claim 9, wherein the cross sectional area of said first electrode member is substantially equal to the cross sectional area of said second electrode member.

15. The construction of claim 9, wherein the threads on said members are spaced axially along the length of said unit.

16. The construction of claim 9, wherein a portion of the length of the mounting member is deformed radially inward to provide a seal between the members.

17. The construction of claim 16, wherein the radially deformed portion is spaced axially from the threads of said members.

18. A coaxial terminal construction for a sealed battery, comprising a sealed vessel having an opening therein; an annular mounting flange secured within the opening and having an internal thread, a group of battery cells disposed within the vessel and having a pair of electric terminal means; a pre-assembled terminal unit including a first electrode, a second electrode insulated from said first electrode and disposed concentrically around said first electrode, an annular mounting member disposed concentrically around said second electrode and insulated therefrom, said mounting member having an external thread engaged with the internal thread of said mounting flange; first connecting means for effecting an electrical connection between a first of said terminal means and said first electrode as said mounting member is threaded in said mounting flange; and second connecting means for effecting an electrical connection between a second of said terminal means and said second electrode as said mounting means is threaded to said mounting flange, a portion of the length of said mounting member being deformed radially inward to provide a sealing engagement between said mounting member and said second electrode and between said second electrode and said first electrode.

19. The construction of claim 18, and including an insulating sleeve disposed between said mounting member and said second electrode, and a second insulating sleeve disposed between said second electrode and said first electrode.

20. The construction of claim 1, wherein said vessel is composed of metal.

21. The construction of claim 1, wherein said electrodes are formed of copper.

22. The construction of claim 18, wherein said mounting member includes a tubular section and a radial section extending radially outward from said tubular section, the external thread on said mounting member being disposed on said tubular section, said construction also including sealing means between said radial section and said mounting flange.

23. The construction of claim 22, wherein said sealing means comprises an O-ring.

* * * * *